(12) United States Patent
Doerr

(10) Patent No.: US 7,609,934 B2
(45) Date of Patent: Oct. 27, 2009

(54) INTEGRATED TUNABLE OPTICAL EQUALIZER

(75) Inventor: Christopher Richard Doerr, Middletown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 12/055,115

(22) Filed: Mar. 25, 2008

(65) Prior Publication Data
US 2009/0245713 A1    Oct. 1, 2009

(51) Int. Cl.
*G02B 6/00* (2006.01)
(52) U.S. Cl. .................................. 385/140; 385/134
(58) Field of Classification Search ............... 385/140, 385/134
See application file for complete search history.

(56) References Cited

U.S. PATENT DOCUMENTS

| 6,785,446 B1 | 8/2004 | Chandrasekhar et al. |
| 6,804,434 B1 | 10/2004 | Chandrasekhar et al. |
| 7,308,169 B2 | 12/2007 | Chandrasekhar et al. |

*Primary Examiner*—Jennifer Doan
(74) *Attorney, Agent, or Firm*—Hitt Gains, PC

(57) ABSTRACT

Provided is an apparatus and method for use thereof. The apparatus, in one embodiment, includes first and second 1×N couplers integrated on a substrate and configured to receive an optical symbol having an intended time slot, N being at least three. The apparatus, in this embodiment, further includes N waveguide arms integrated on the substrate, having modulators and coupled between the first and second 1×N couplers. The apparatus, in this embodiment, additionally, includes a modulator controller configured to drive the modulators such that, following transmission over a distance, components of the optical symbol outside of the intended time slot are attenuated relative to components within the intended time slot.

24 Claims, 11 Drawing Sheets

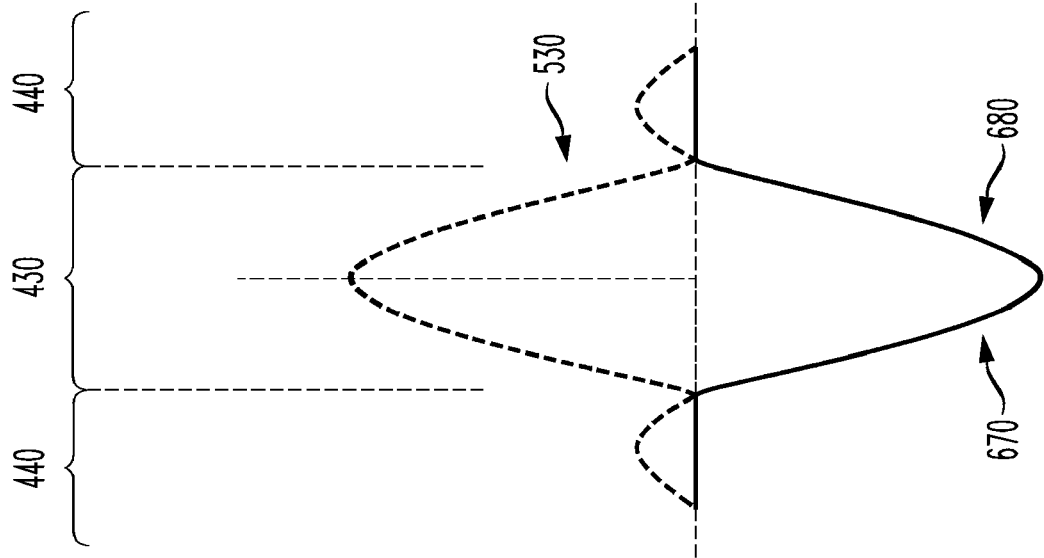
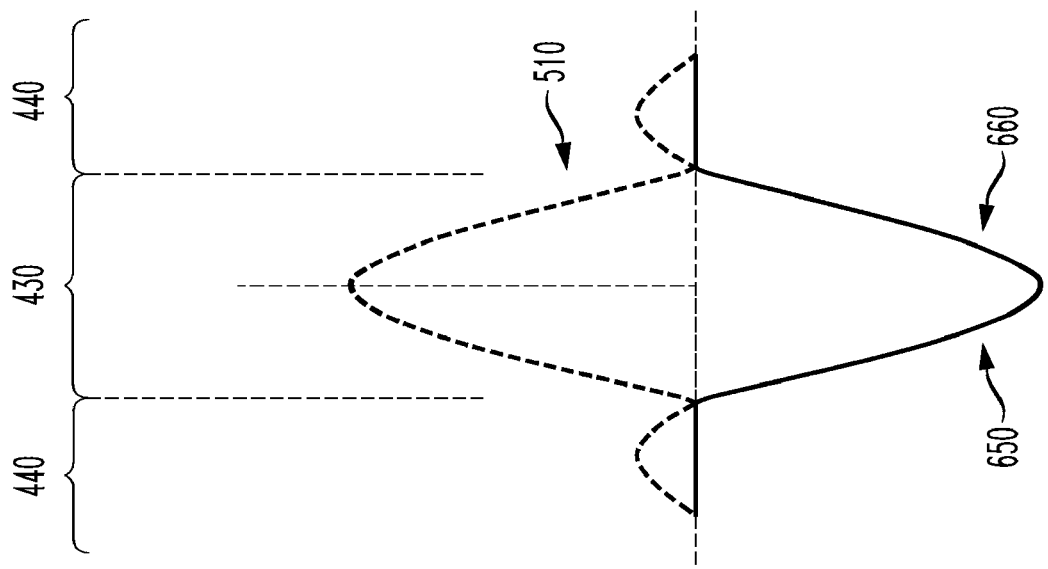

INTEGRATED TUNABLE OPTICAL EQUALIZER

TECHNICAL FIELD

The present disclosure is directed, in general, to an integrated tunable optical equalizer.

BACKGROUND

Adjustable dispersion compensators (e.g., tunable optical equalizers) are often required in optical communication systems using high symbol rates and/or transmission distances over a few kilometers. Today's optical communication systems employ two main configurations of dispersion compensators, namely electrical compensation and optical compensation, both of which have inherent drawbacks. For example, today's electrical dispersion compensators exhibit limited performance at the aforementioned high symbol rates, as well as consume considerable power. On the other hand, today's tunable optical dispersion compensators exhibit higher performance at such high symbol rates, but are extremely large, are in a separate module from the associated transceiver, and also consume considerable power.

Because of the aforementioned drawbacks, high symbol rate intermediate and/or long-range transceivers have gained limited acceptance. Accordingly, what is needed is an apparatus and method of use that address the aforementioned drawbacks.

SUMMARY

To address the above-discussed deficiencies of the prior art, various embodiments provide an apparatus and method for use thereof. The apparatus, in one embodiment, includes first and second 1×N couplers integrated on a substrate and configured to receive an optical symbol having an intended time slot, N being at least three. The apparatus, in this embodiment, further includes N waveguide arms integrated on the substrate, having modulators and coupled between the first and second 1×N couplers. The apparatus, in this embodiment, additionally includes a modulator controller configured to drive the modulators such that, following transmission over a distance, components of the optical symbol outside of the intended time slot are attenuated relative to components within the intended time slot.

Further provided is the method for use. The method for use, in one embodiment, includes: 1) imparting an optical symbol having an intended time slot on an optical waveguide integrated on a substrate, 2) separating the optical symbol into products using a first 1×N coupler coupled to the optical waveguide, and imparting the products on N waveguide arms integrated on the substrate, N being at least three, 3) driving modulators associated with the N waveguide arms using a modulator controller to provide modulated products, and 4) combining the modulated products using a second 1×N coupler integrated on the substrate and coupled to the N waveguide arms such that, following transmission over a distance, components of the optical symbol outside of the intended time slot are attenuated relative to components of the optical symbol within the intended time slot.

BRIEF DESCRIPTION OF THE DRAWINGS

For a more complete understanding of the disclosure, reference is now made to the following descriptions:

FIGS. 6A thru 6D illustrate another general profile of one specific optical symbol as it traverses an optical system similar to the optical system of FIG. 3.

DETAILED DESCRIPTION

Figure 1A:
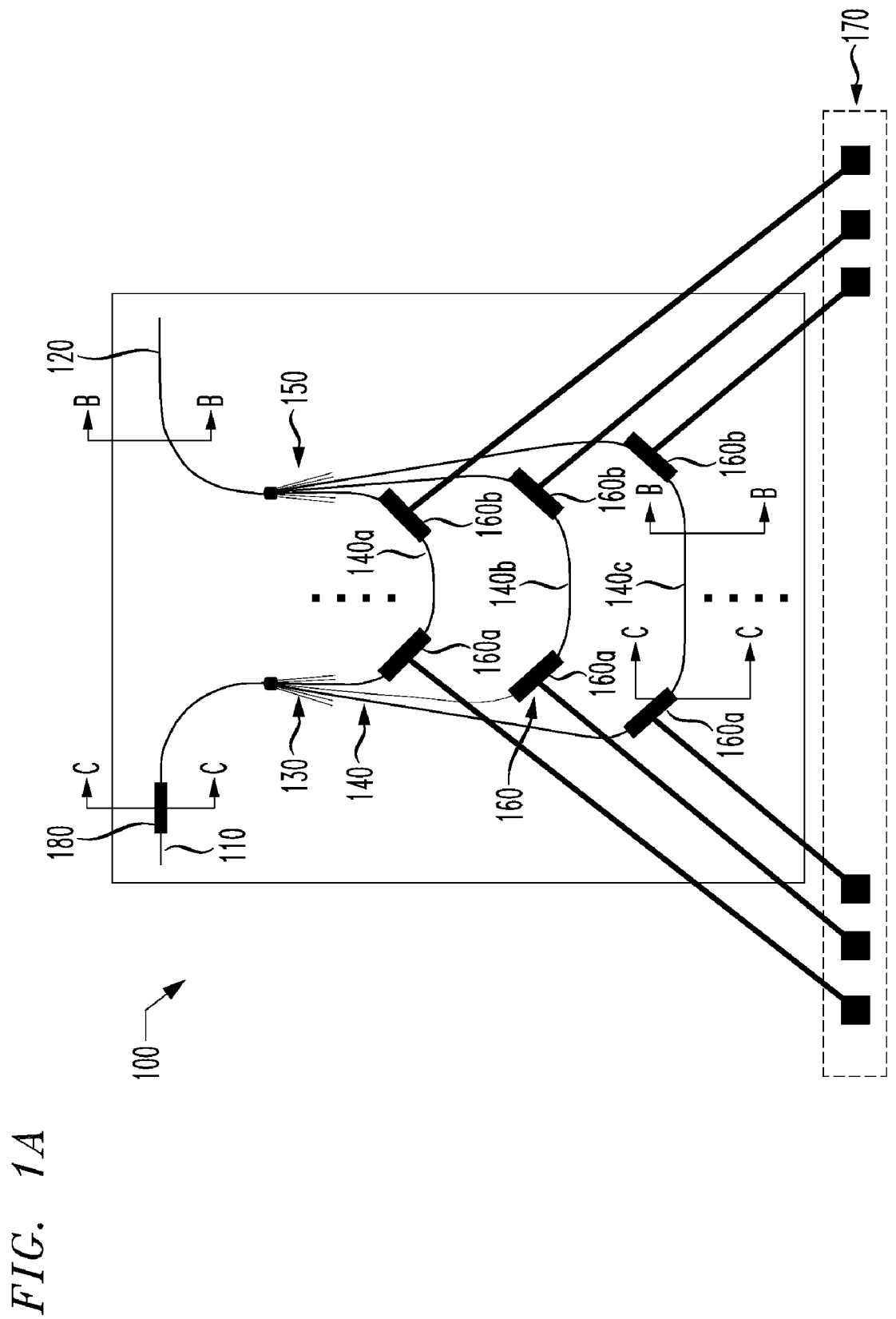
FIGS. 1A thru 1C illustrate various views of an apparatus manufactured in accordance with the disclosure.

Turning initially to FIG. 1A, illustrated is an apparatus 100 manufactured in accordance with the disclosure. The apparatus 100 of FIG. 1A can, in one embodiment, be configured as a type of optical transversal filter (e.g., optical equalizer). For example, the apparatus 100 can be configured as an integrated tunable optical dispersion compensator to adjustably compensate for chromatic dispersion. In other embodiments, however, the apparatus 100 may be configured to compensate for optical filter narrowing or transmitter/receiver bandwidth limitations, among other impairments.

The apparatus 100 of FIG. 1A includes a substrate 105. The substrate 105 may be any substrate, wafer or otherwise, known or hereafter discovered for use in optical systems. In the embodiment depicted in FIG. 1A, however, the substrate 105 comprises an n-type doped indium phosphide substrate. Nevertheless, other substrates can be used, such as semi-insulating InP substrates and silicon substrates.

Integrated on the substrate 105 in the apparatus 100 of FIG. 1A are an input optical waveguide 110 and an output optical waveguide 120. The input and output optical waveguides 110, 120 may comprise many different structures. In one embodiment, the input and output optical waveguides 110, 120 comprise a waveguide integrated onto the substrate 105. For example, the input and output optical waveguides 110, 120 might comprise a benzocyclobutene (BCB)-clad ridge waveguides with a collection of quantum wells in a p-i-n structure, all of which are formed on/over the doped indium phosphide substrate 105. However, other embodiments exist wherein the input and output optical waveguides 110, 120 comprise different features and materials. As one might expect, the input and output optical waveguides 110, 120, in one embodiment, may be configured to couple to associated optical fibers (e.g., single-mode fibers).

Coupled to the input optical waveguide 110 is a first 1×N coupler 130. The phrase 1×N coupler, as used herein, refers to a coupler having a single operational input port and N operational output ports, or alternatively a coupler having N operational input ports and a single operational output port. The letter "N", in this context, is at least three (3). Given this definition, input ports and output ports that are not operational, for example those not coupled to a useful optical waveguide, are not to be considered when defining the 1×N coupler.

The first 1×N coupler 130 may comprise many different configurations while staying within the scope of the disclosure. In the embodiment shown, however, the first 1×N coupler 130 comprises a star coupler. In other embodiments, the 1×N coupler 130 comprises a multimode interference coupler, or other useful coupler. Even though the first 1×N coupler 130 illustrated in FIG. 1A includes upwards of seven outputs, only three of the outputs of the 1×N coupler 130 illustrated in FIG. 1A are operational. Thus, the first 1×N coupler 130 of FIG. 1A comprises a 1×3 star coupler.

The first 1×N coupler 130 often comprises the same material structure as the input and output waveguides 110, 120. Accordingly, in the embodiment of FIG. 1A the first 1×N coupler 130 comprises a benzocyclobutene (BCB)-clad ridge waveguides with a collection of quantum wells in a p-i-n structure. Nevertheless, other embodiments exist wherein the first 1×N coupler 130 comprises different features and materials than the input and output waveguides 110, 120.

Figure 2:
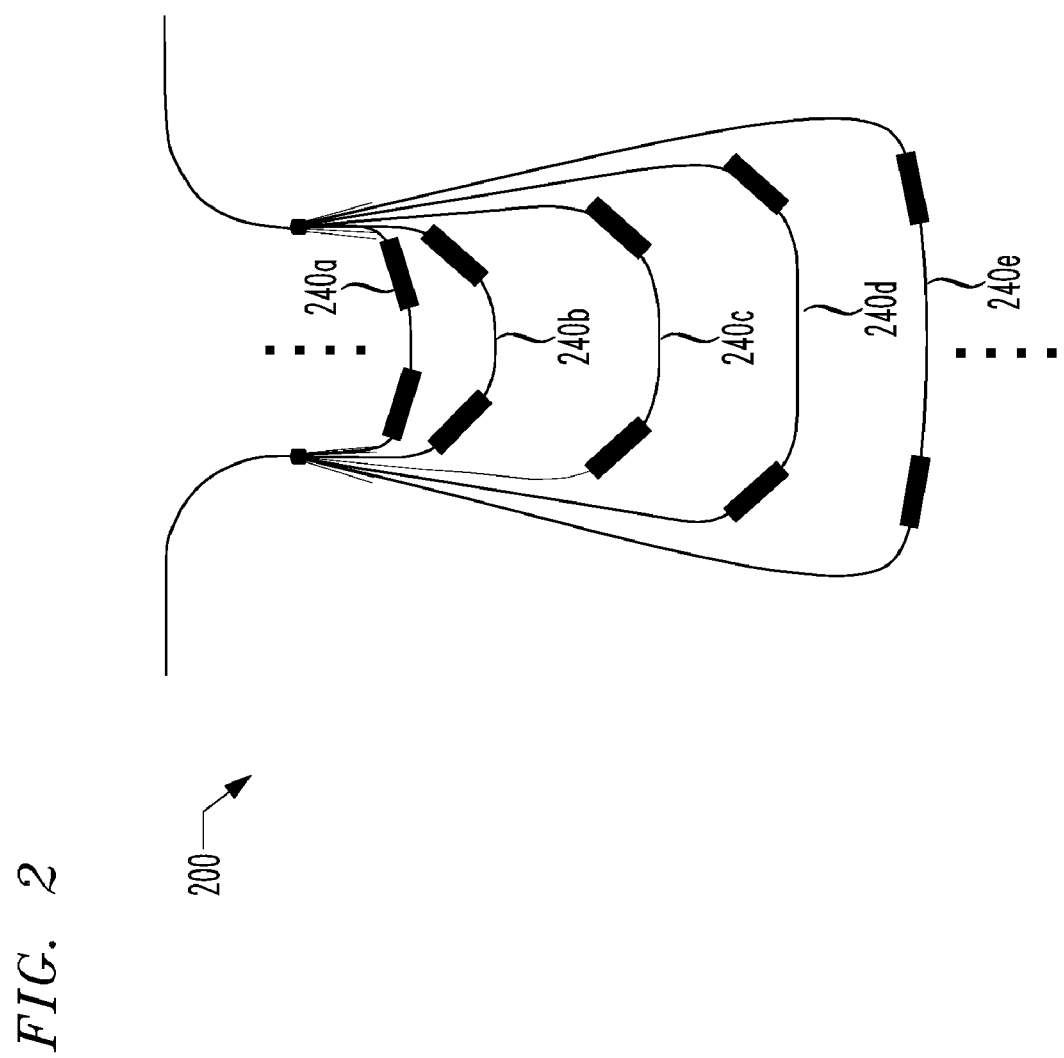
FIG. 2 illustrates an alternative embodiment of an apparatus manufactured in accordance with the disclosure

In the embodiment of FIG. 1A, N waveguide arms 140 are coupled to the first 1×N coupler 130 and integrated on the substrate 105. More specifically, in the embodiment of FIG. 1A, only three (3) waveguide arms 140a, 140b, 140c are coupled to the first 1×N coupler 130. However, as indicated by the ellipses on either side of the collection of waveguide arms 140a, 140b, 140c, a greater number of waveguide arms 140 may be used. For example, turning briefly to FIG. 2, illustrated is an apparatus 200 having five (5) waveguide arms 240a, 240b, 240c, 240d, and 240e. The apparatus 200 of FIG. 2 additionally includes the ellipses, thereby indicating that it could conceivably include additional waveguide arms. It should be understood that the inclusion of additional pairs of waveguide arms allows such an apparatus to compensate for greater amounts of dispersion. For example, a three waveguide arm apparatus might be configured to compensate for dispersion that extends out 1 bit slot on each side of the desired bit slot. On the other hand, a five waveguide arm apparatus might be configured to compensate for dispersion that extends out 2 bit slots on each side of the desired bit slot.

In certain embodiments, it is important for the N waveguide arms 140 to be odd in number. For instance, in such embodiments it may be important for the waveguide arms 140 of the apparatus 100 to number three, five, seven, nine, etc. This may be advantageous as it provides a center most waveguide arm. In the embodiment of FIG. 1A, the center most waveguide arm is the waveguide arm 140b, whereas in the embodiment of FIG. 2, the center most waveguide arm is the waveguide arm 240c.

The N waveguide arms 140, in accordance with one embodiment, should each have different optical path lengths. In a similar embodiment, the optical pathlength of each of the N waveguide arms 140 sequentially changes by a fixed amount $\Delta L$. The fixed amount $\Delta L$, in one embodiment, creates a delay that is less than a bit period of an optical symbol that the apparatus 100 is configured to receive. An optical symbol, in this context, is a small unit of data that is transmitted at one time. For example, in the embodiment of FIG. 1A, the $\Delta L$ between the first waveguide arm 140a and the second waveguide arm 140b creates about a 14.3 ps delay therebetween. Additionally, the $\Delta L$ between the second waveguide arm 140b and the third waveguide arm 140c creates about a 14.3 ps delay therebetween. In this example, the delay between the first waveguide arm 140a and the third waveguide arm 140c would be about 28.6 ps. The delay time between adjacent waveguides is preferably chosen to be approximately 60-80% of the symbol period. For the example just mentioned, the symbol period it was designed for is about 25 ps. Nevertheless, other values for the $\Delta L$ may exist.

The first 1×N coupler 130, in one embodiment, is configured to transmit a greatest amount of power of the optical symbol along the center most waveguide arm. In turn, the first 1×N coupler 130, in this embodiment, is configured to transmit lesser amounts of the power of the optical symbol along the opposing pairs of side waveguide arms. Accordingly, in this disclosed embodiment, the center most waveguide arm delivers the main impulse of the impulse response while the opposing pairs of side waveguide arms deliver the satellite impulses of the impulse response. Therefore, in the example embodiment of FIG. 1A, the main impulse would be delivered by the waveguide arm 140b, and the satellite impulses would be delivered by the side waveguide arms 140a, 140c. Similarly, in the example embodiment of FIG. 2, the main impulse would be delivered by the center waveguide arm 240c, and the satellite impulses would be delivered by the side waveguide arms 240a, 240b, 240d, 240e. More specifically, the main impulse would have the most power, the satellite impulses delivered to the side waveguide arms 240b, 240d, would have the next most power and the satellite impulses delivered to the side waveguide arms 240a, 240e would have the least power. Thus, the first 1×N coupler 130 of FIGS. 1A and 2 is not an even splitting coupler (e.g., not a fixed ratio coupler).

In the embodiment shown in FIG. 1A, the N waveguide arms 140 comprise the same material structure as the input and output waveguides 110, 120 and the first 1×N coupler 130. Accordingly, in the embodiment of FIG. 1A the N waveguide arms 140 comprise a benzocyclobutene (BCB)-clad ridge waveguides with a collection of quantum wells in a p-i-n structure. As indicated above with regard to previously described features, other embodiments exist wherein the N waveguide arms 140 comprises different features and/or materials than the input and output waveguides 110, 120 and/or first 1×N coupler 130.

Coupled between the N waveguide arms 140 and the output waveguide 120, and integrated on the substrate 105, is a second 1×N coupler 150. It should be noted that while the second 1×N coupler 150 is being referred to as a 1×N coupler, it is actually functioning as a N×1 combiner, and thus may be referred to as such. The letter "N", in this context, is again at least three (3). Moreover, "N" should be a fixed value amongst the first 1×N coupler 130, the N waveguide arms 140, and the second 1×N coupler 150. Therefore, if the first 1×N coupler 130 of FIG. 1A is a 1×3 coupler, the second 1×N coupler 150 of FIG. 1A should typically also be a 1×3 coupler.

The second 1×N coupler 150 would typically comprise a similar structure, and include similar materials, as the first 1×N coupler 130. Accordingly, the second 1×N coupler 150 of FIG. 1A comprises a benzocyclobutene (BCB)-clad ridge waveguides with a collection of quantum wells in a p-i-n structure. Nevertheless, other embodiments exist wherein the second 1×N coupler 150 comprises different features and materials than the input and output waveguides 110, 120, and/or first 1×N coupler 130. Like the first 1×N coupler 130, in a preferred embodiment the second 1×N coupler couples more power from the center arm and less from the outer arms. In this embodiment the second 1×N coupler 150 would typically not be a fixed ratio coupler.

The 1×N coupler power distribution may be efficiently accomplished by using a star coupler. A star coupler with a waveguide on the side with one port with little or no mutual coupling to neighboring waveguides naturally provides a Gaussian-like power distribution to the N waveguides, with the peak in the center. Such a distribution is advantageous because the desired amount of power in outer arms is smaller than that of the center arms for most practical cases of optical equalization. This helps reduce the overall insertion loss of the equalizer because less attenuation by amplitude modulation is required.

The apparatus 100 of FIG. 1A additionally includes one or more modulators 160 associated with the N waveguide arms 140. In the example embodiment of FIG. 1A, the modulators 160 are configured as electro-optic modulators. In this example embodiment, ones of the modulators 160a may be reverse biased (e.g., negative voltage applied thereto) to get amplitude modulation and others of the modulators 160b may be forward biased (e.g., positive voltage applied thereto) to get phase modulation. Note that it is also possible to get amplitude modulation from current injection due to free-carrier absorption, an effect often used in silicon photonics. It is also possible to place an electric heater over the waveguide to obtain a phase shift using the thermooptic effect. It is often the case wherein the modulators 160a, 160b of the center most waveguide arm 140b are not employed, and therefore the amplitude modulation and phase modulation is accomplished using the modulators 160a, 160b of the side waveguide arms 140a, 140c. In such an embodiment, the center most waveguide arm 140b might be devoid of a modulator. However, instances do exist wherein amplitude or phase modulation does occur on the center most waveguide arm 140b, whether it be in conjunction with amplitude or phase modulation occurring on the side waveguide arms 140a, 140c or not. As the modulators 160 are designed with semiconductor materials, they tend to consume very little power.

Associated with the one or more modulators 160 is a modulator controller 170. The modulator controller 170, in this embodiment, is configured to drive the modulators 160. For instance, the modulator controller 170 is configured to provide the appropriate negative voltages and positive voltages upon the modulators 160a, 160b, respectively. In accordance with the disclosure, the modulator controller 170 is configured to drive the modulators 160a, 160b, such that following the transmission of an optical symbol (e.g., having an intended time slot) over a distance, components of the optical symbol outside of the intended time slot are attenuated relative to components of the optical symbol within the intended time slot. Additional details regarding the mechanism by which the modulator controller 170 drives the modulators 160 will be provided below.

Depending on whether the apparatus 100 is located at a transmitter side or receiver side of an optical system, the apparatus 100 may further include a data modulator. In the given embodiment of FIG. 1A, the apparatus 100 is located proximate a transmitter side of an optical system. Accordingly, in this embodiment, the apparatus 100 may include a data modulator 180. For instance, the apparatus 100 may include an electro-absorption data modulator configured to assist in the creation of an optical symbol that will ultimately traverse the first 1×N coupler 130, the N waveguide arms 140, and the second 1×N coupler 150.

It should additionally be noted that if the apparatus 100 is located proximate a transmitter side of an optical system, a transmitter may be integrated on the substrate 105 with the apparatus 100. More specifically, in this embodiment the transmitter may be integrated on the substrate 105 between the input waveguide 110 and the data modulator 180. Additionally, if the apparatus 100 is located proximate a receiver side of an optical system, a receiver may be integrated on the substrate 105 with the apparatus 100. In this embodiment, the receiver may be integrated on the substrate 105 after the second 1×N coupler 150 and proximate the output waveguide 120. As the substrate 105 of FIG. 1A comprises indium phosphide, the apparatus 100 and transmitter, or alternatively the apparatus 100 and receiver, can be integrated on an indium phosphide substrate. Because indium phosphide based transmitters and receivers currently exist, their integration with an apparatus 100 manufactured in accordance with the disclosure is relatively simple. Additionally, an apparatus, such as the apparatus 100, may be incorporated in a package that is only a few millimeters in width and length.

In those embodiments wherein the apparatus 100 is located proximate the transmitter the apparatus can be polarization dependent. However, in those embodiments wherein the apparatus 100 is located proximate the receiver the apparatus should be polarization independent. In certain embodiments, the inclusion of the apparatus 100 near the transmitter is easier to employ because of the requirement that it often be polarization independent when it is at the receiver.

Figure 1C:
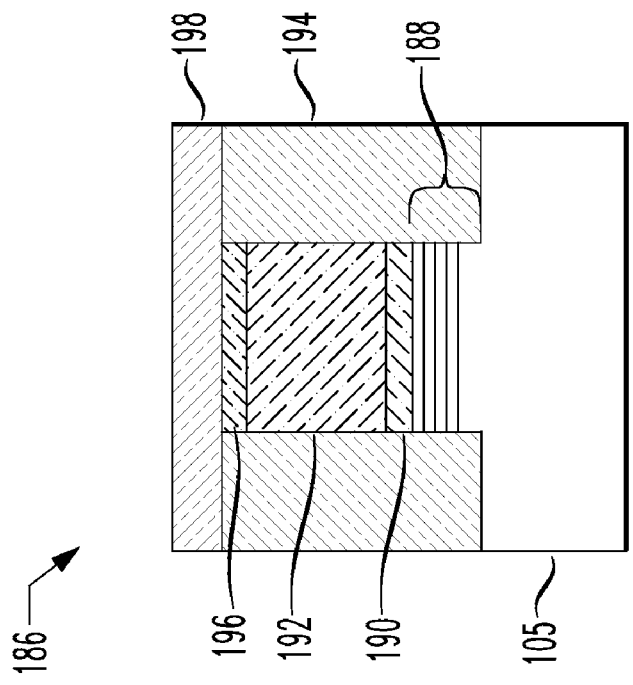
Figure 1B:
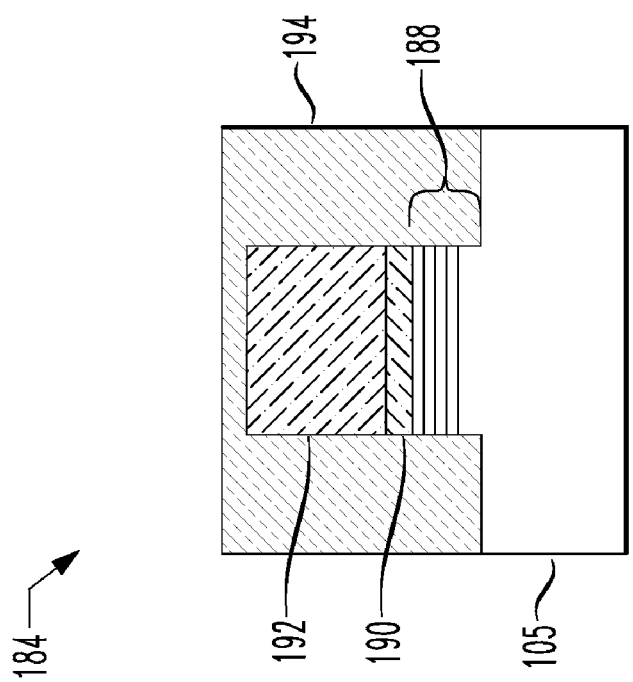

Turning now to FIGS. 1B and 1C, illustrated are cross-sectional views of the apparatus 100 taken through the lines B-B and C-C, respectively. FIG. 1B illustrates a cross-sectional view 184 of the apparatus 100 through a waveguide portion thereof, whereas FIG. 1C illustrates a cross-sectional view 186 of the apparatus 100 through a modulator portion thereof.

The portion of the apparatus 100 taken through the view 184 initially includes the substrate 105. In the embodiment of FIG. 1B, the substrate 105 comprises n-type doped indium phosphide. Located over the substrate 105 in the view 184 is a ridge-shaped waveguide. The ridge-shaped waveguide includes a collection of quantum wells 188, in this embodiment eight quantum wells. Positioned over the quantum wells 188 is an intrinsic indium phosphide layer 190. Positioned over the intrinsic indium phosphide layer 190 is a p-type doped indium phosphide layer 192. The substrate 105, intrinsic indium phosphide layer 190 and the p-type doped indium phosphide layer 192, in the disclosed embodiment, collectively form a p-i-n structure. Surrounding the ridge-shaped waveguide in the view 184 is a cladding layer 194, in this embodiment benzocyclobutene (BCB).

The portion of the apparatus 100 taken through the view 186 also includes the substrate 105, the collection of quantum wells 188, the intrinsic indium phosphide layer 190, the p-type doped indium phosphide layer 192, and the cladding layer 194. However, as compared to the view 184, the view 186 includes a p-type indium gallium arsenide contact 196, as well as a top side contact 198. These two additional features will allow this portion of the apparatus 100 to function as an electro-optic modulator.

The cross-sectional views 184, 186 illustrated in FIGS. 1B and 1C illustrate but one configuration for the waveguides and modulators of the apparatus 100. Moreover, while the views 184 and 186 are substantially similar to one another but for a few additional features in the view 186, those skilled in the art understand that the similarities have been selected for fabrication convenience. Accordingly, in certain other embodiments the views 184, 186 will differ significantly with respect to one another. For example, it is believed that greater loss reduction may be accomplished by individually tailoring each of the waveguide and modulator portions of the apparatus 100. However, such a device would be much more difficult to manufacture.

An apparatus, such as the apparatus 100 of FIGS. 1A thru 1C, may be manufactured in a variety of different manners. Nevertheless, in one embodiment, such an apparatus is manufactured by first growing a 2 μm thick n-doped indium phosphide layer on n-doped indium phosphide wafer. Thereafter, eight quantum wells may be sandwiched between 1.3 μm bandgap indium gallium arsenide phosphide separate confinement layers. The quantum wells, in one embodiment, are 0.3% tensile strained with compressive strained barriers. Additionally, the indium gallium arsenide phosphide separate confinement layers are each about 10 nm thick.

Thereafter, an undoped (e.g., intrinsic) 125 nm indium phosphide layer may be grown over the quantum well structure. Additionally, a 1.8 µm p-doped indium phosphide layer may be grown over the intrinsic layer. This p-doped indium phosphide layer typically has a gradually increasing dopant concentration as it moves away from the intrinsic layer. Thereafter, a heavily p-doped indium gallium arsenide layer may be formed over the p-doped indium phosphide layer. The heavily p-doped indium gallium arsenide layer located over the passive waveguides may thereafter be removed.

After removing the p-doped indium gallium arsenide layer from over the passive waveguide portion, the structure may be reactive-ion etched using silica as a mask to a depth of about 2.3 µm. BCB may then be spun on and cured. Thereafter, ground pads may be etched through the BCB to the grown n-doped indium phosphide layer. Small openings in the BCB may then be etched over the modulators and static phase shifters. Top-side metal may then be deposited and patterned via lift-off. While one very specific process for manufacturing an apparatus in accordance with the disclosure has been given, those skilled in the art understand many of methods and/or materials might be used to manufacture such an apparatus.

An apparatus, such as the apparatus 100 of FIGS. 1A, 1B and 1C, may be operated (e.g., used) in a variety of different ways. Nevertheless, in one embodiment, such the apparatus 100 would initially be operated by imparting an optical symbol having an intended time slot on the input waveguide 110. The optical symbol would then encounter the first 1×N coupler 130. The first 1×N coupler 130, in this example of use, would separate the optical symbol into products, and thereafter impart the separated products on the N waveguide arms 140 also integrated on the substrate 105.

The modulators 160 associated with the N waveguide arms 140 would then be driven to provide modulated products on any one or all of the N waveguide arms 140. For example, a modulator controller 170 could drive the modulators 160. The modulated products, as well as any products that were not modulated, would then encounter the second 1×N coupler 150 integrated on the substrate 105. As one would expect, the second 1×N coupler 150 would combine the modulated products, as well as any products that were not modulated. Assuming that the modulators were driven properly, and following transmission of the optical symbol over a distance (e.g., a transmission medium), components of the optical symbol outside of the intended time slot would be attenuated relative to components of the optical symbol within the intended time slot.

Figure 3:
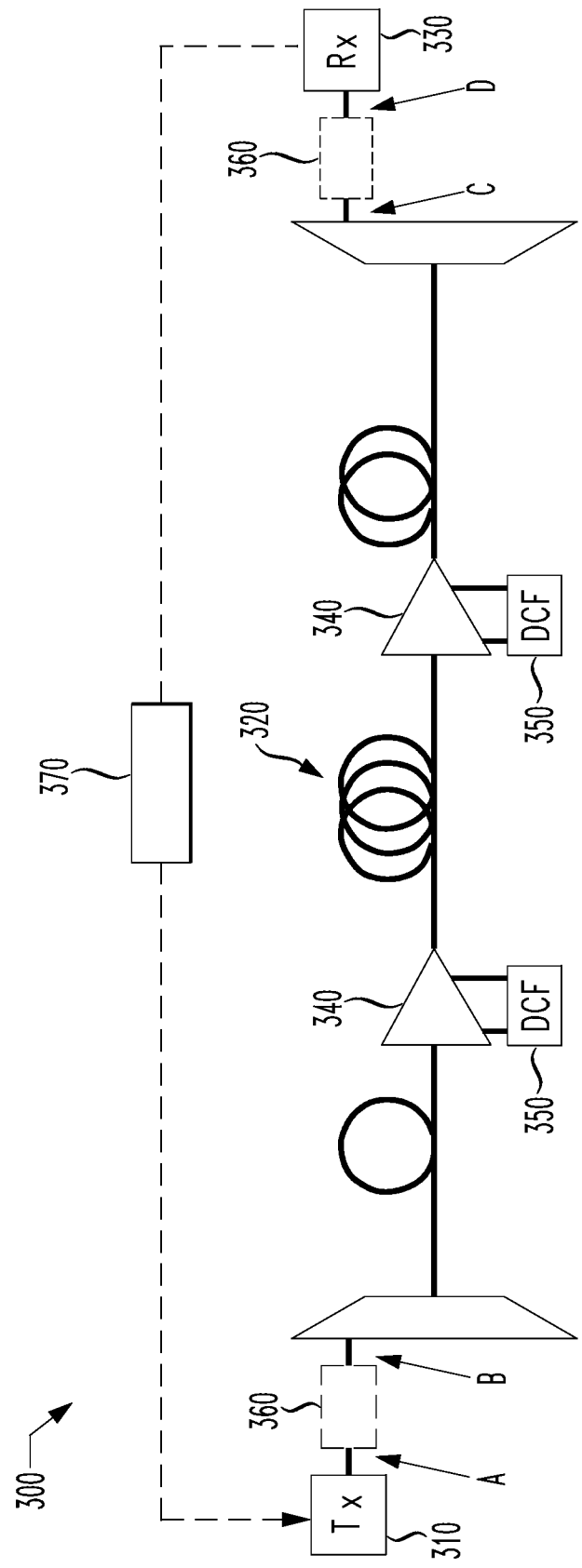
FIG. 3 illustrates an optical system including an apparatus manufactured in accordance with the disclosure.

FIG. 3 illustrates an optical system 300 manufactured in accordance with the disclosure. An optical system, such as the optical system 300 of FIG. 3, might be used as a communications system (e.g., telecommunications system, data communications system, etc.), among other uses. While the optical system 300 of FIG. 3 is illustrated at a very high level, for example including only a handful of relevant elements, those skilled in the art understand that such systems are often very complex, thereby including many different very intricate elements. Nevertheless, for ease of understanding, the system 300 of FIG. 3 has been simplified down to the various elements shown.

The optical system 300 of FIG. 3 initially includes a transmitter 310. The transmitter 310, in this embodiment, is coupled via a transmission medium 320 to a receiver 330. Positioned at various locations along the transmission medium 320, in the embodiment of FIG. 3, are one or more optical amplifiers 340. Additionally, positioned at various locations along the transmission medium 320, in the embodiment of FIG. 3, are one or more dispersion compensating filters (DCFs) 350. The DCFs 350, in this optical system 300, are configured to assist in reducing the amount of dispersion that may occur as an optical symbol travels across the transmission medium 320.

In accordance with the disclosure, the optical system 300 of FIG. 3 further includes an apparatus 360 positioned proximate at least one of the transmitter 310 or receiver 330. The apparatus 360, when manufactured in accordance with this disclosure, may be similar to the apparatus 100, 200 of FIGS. 1A and 2. However, other apparatus may be used that are not similar to the apparatus 100, 200 of FIGS. 1A and 2, but still remain within the purview of the disclosure.

The apparatus 360, in one embodiment, is integrated with either of the transmitter 310 or receiver 330 and is configured as a tunable optical equalizer. For example, the apparatus 360 could be configured as a type of optical transversal filter. In this instance, the optical transversal filter could function as an integrated tunable optical dispersion compensator. Accordingly, the apparatus 360, in one embodiment, could be used in conjunction with the DCFs 350 to reduce the effect that dispersion has on an optical symbol after having traveled across the transmission medium 320.

The optical system 300, in accordance with the disclosure, may additionally include a feedback controller 370. The feedback controller 370 is particularly beneficial in those embodiments wherein the apparatus 360 is positioned proximate, or integrated with, the transmitter 310. In such embodiments, the feedback controller 370 may be used to feed back information to the apparatus 360 regarding an optical symbol having been transmitted over the transmission medium 320. Accordingly, the apparatus 360 may be used to modulate an amplitude or phase of at least a portion of the initial optical symbol based upon such feedback information. In those embodiments wherein the apparatus 360 is positioned proximate the receiver 330, a feedback controller, such as the feedback controller 370, is less beneficial.

Figure 4B:
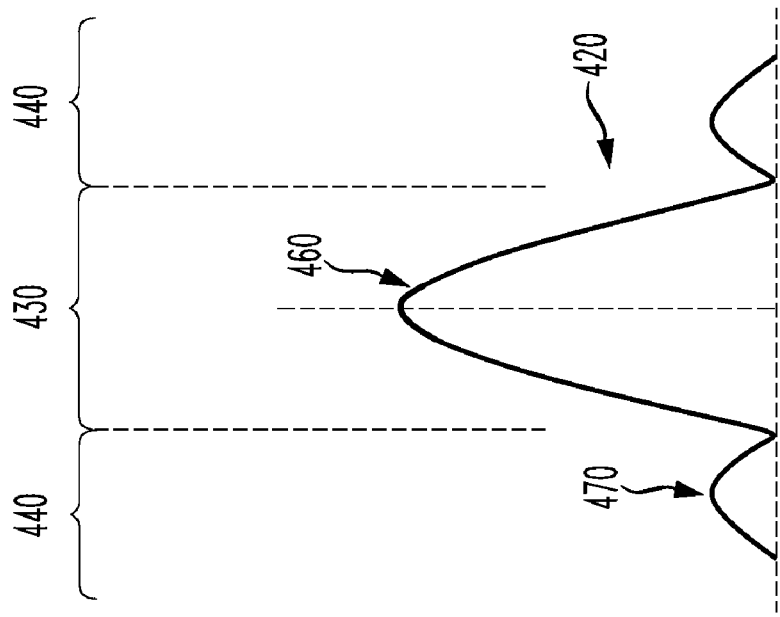
FIGS. 4A and 4B illustrate an ideal and a less than ideal optical symbol example.
Figure 4A:
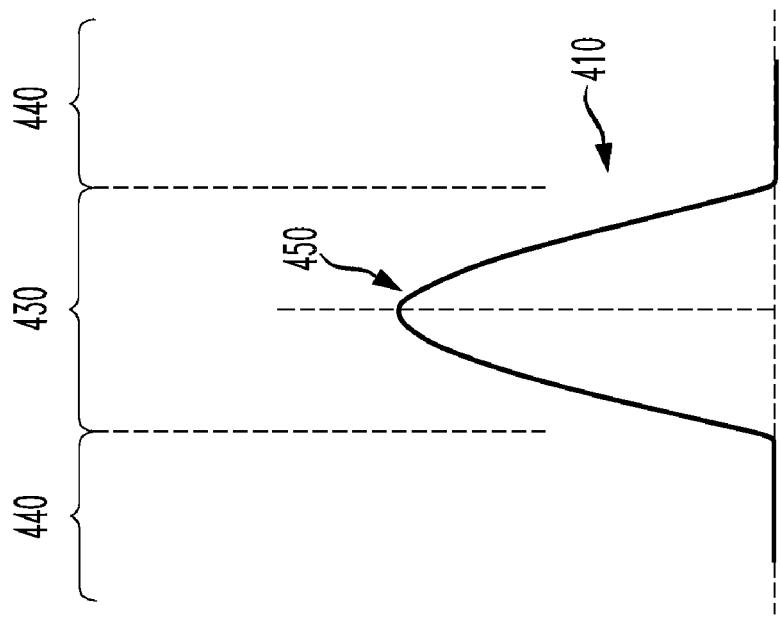

Attention will now turn to FIGS. 4A and 4B. FIG. 4A illustrates one embodiment of an ideal optical symbol 410, representing one packet of information, as it might appear at a given point in an optical system. FIG. 4B, on the other hand, illustrates one embodiment of a less than ideal optical symbol 420, representing the same packet of information, as it might appear at a different given point in the optical system. The ideal optical symbol 410 and the less than ideal optical symbol 420, in the embodiment of FIGS. 4A and 4B, take the form of a waveform. The less than ideal optical symbol 420 is representative of the effect that dispersion, or another similar impairment, may have on an ideal optical symbol after traversing a distance of a transmission medium.

Each of the ideal optical symbol 410 and the less than ideal optical symbol 420 include a region 430 representing an intended time slot, as well as one or more regions 440 representing non-intended time slots. The ideal optical symbol 410, as shown, includes a central lobe 450 located within the intended time slot region 430. The less than ideal optical symbol 420, as shown, includes a central lobe 460 located within the intended time slot region 430, as well as side lobes 470 located outside of the intended time slot region 430 (e.g., within the regions representing the non-intended time slots 440). Those skilled in the art understand that dispersion, or another similar impairment, can create the side lobes 470.

Attention will now turn to FIGS. 5A thru 5D, with continued reference to FIGS. 3, 4A, 4B, and brief reference to FIG. 1A. Like reference numbers, in this description, will be used to indicate like features. FIGS. 5A thru 5D illustrate the general profile of one specific optical symbol as it traverses an optical system similar to the optical system of FIG. 3. The optical symbol may be tracked at points A, B, C, and D of FIG. 3, and will be illustrated in the associated FIGS. 5A thru 5D. The embodiment of FIGS. 5A thru 5D is based upon the assumption that the apparatus 360 of FIG. 3 is positioned proximate the transmitter 310, and that the apparatus is similar to the apparatus 100 of FIG. 1A.

Figure 5B:
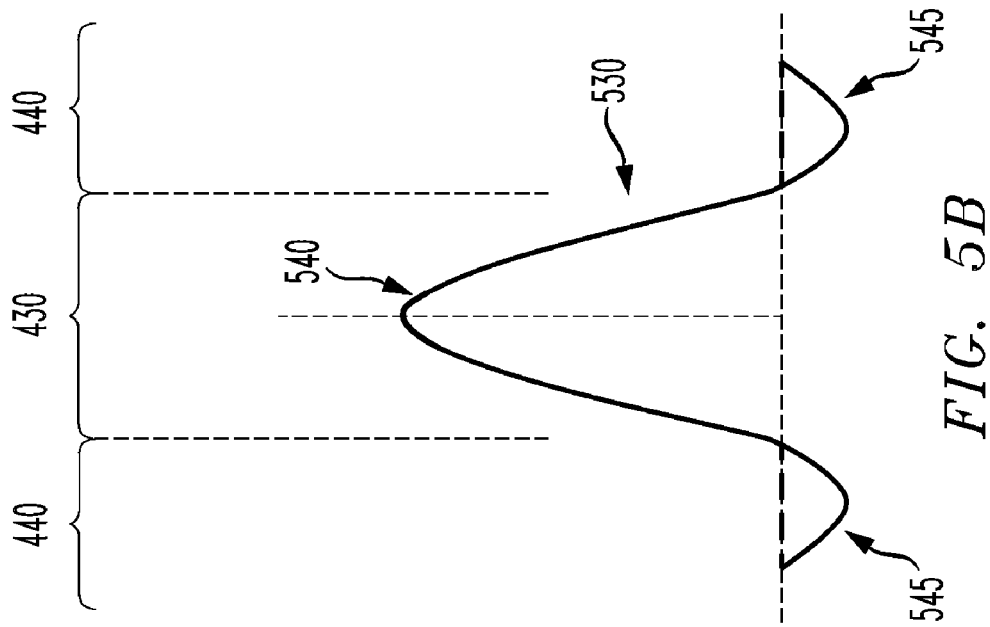
FIGS. 5A thru 5D illustrate the general profile of one specific optical symbol as it traverses an optical system similar to the optical system of FIG. 3.
Figure 5A:
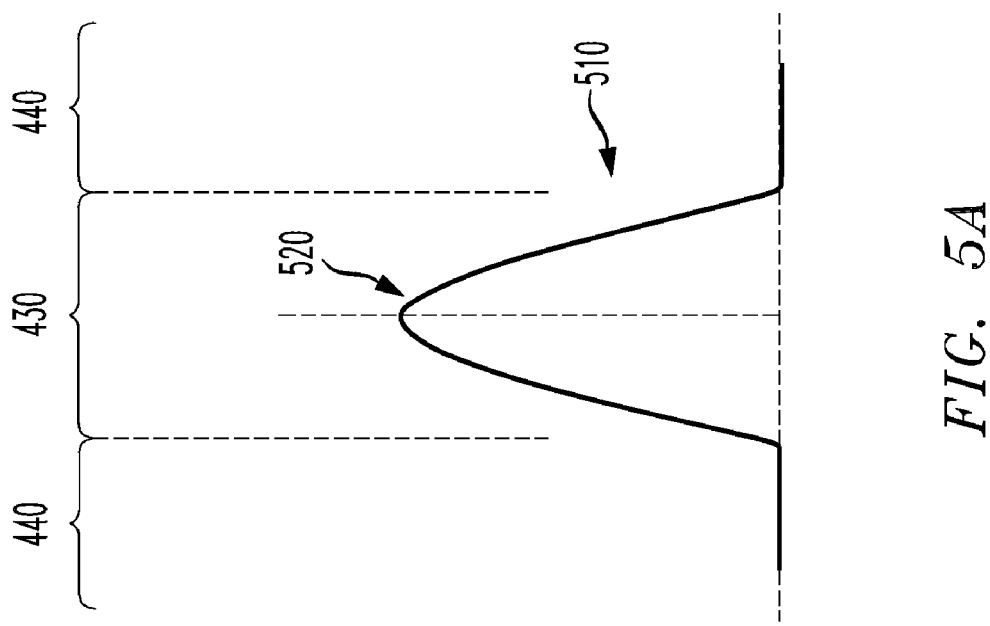

FIG. 5A illustrates an input optical symbol 510, representing one packet of information, as it might appear at point A of the optical system 300 of FIG. 3. The input optical symbol 510, having just been created by a data modulator (e.g., similar to the date modulator 180 of FIG. 1A), has little to no dispersive effects, and thus may be considered an ideal optical symbol. Accordingly, the input optical symbol 510 is focused substantially, if not entirely, within the intended time slot region 430, and in this embodiment is expressed as a central lobe 520.

FIG. 5B illustrates what the input optical symbol 510 might look like at point B of the optical system 300, having passed through the apparatus 360. The apparatus 360, in this disclosed embodiment, is configured to precompensate the input optical symbol 510 for any dispersion, or other impairments, that may result from the input optical symbol 510 traversing the transmission medium 320. For example, the apparatus 360 may be configured to precompensate the input optical symbol 510 based upon information fed back through the feedback controller 370. The feed back of information from the feedback controller 370 to the apparatus 360 may be dynamic, or manual (e.g., based upon a substantially fixed calibration of the optical system), based upon the desired of the optical system. What results after the input optical symbol 510 passes through the apparatus 360, is a precompensated optical symbol 530.

The precompensated optical symbol 530, in this embodiment, includes a central lobe 540 located within the intended time slot region 430, as well as precompensated side lobes 545 located outside of the intended time slot region 430. The precompensated side lobes 545, in the embodiment shown, are more than 90° out of phase with respect to the central lobe 540. For example, in the embodiment of FIG. 5B, the precompensated side lobes 545 are about 180° out of phase with respect to the central lobe 540. Moreover, in the embodiment of FIG. 5B, the precompensated side lobes 545 are designed to offset any dispersive or other related effects that may occur as the symbol traverses the transmission medium 320. Thus, it is desirous that the precompensated side lobes 545 and any resulting dispersive side lobes cancel one another out, therefore ultimately providing an optical symbol substantially contained within the intended time slot 430.

The precompensated optical symbol 530 may be formed by appropriately driving the modulators associated with the apparatus 360. For instance, assuming the apparatus 360 is similar to the apparatus 100 of FIG. 1A, the electro-optic modulators 160a, 160b associated with the side waveguide arms 140a, 140c may be driven by the modulator controller 170, such that energy is transferred from the central lobe 520, resulting in the central lobe 540 and precompensated side lobes 545. Additionally, the electro-optic modulators 160a, 160b associated with the side waveguide arms 140a, 140c may be driven by the modulator controller 170 to alter the phase of the side lobes 545, thus changing their phase with respect to the central lobe 540. Given the teachings herein, those skilled in the art would understand how to drive the modulators 160a, 160b to result in the precompensated optical symbol 530, having the central lobe 540 and the precompensated side lobes 545. For ease of understanding, a dotted line has been included within FIG. 5B indicating what the initial optical symbol 510 might look like at point B were it not to encounter the apparatus 360.

Figure 5D:
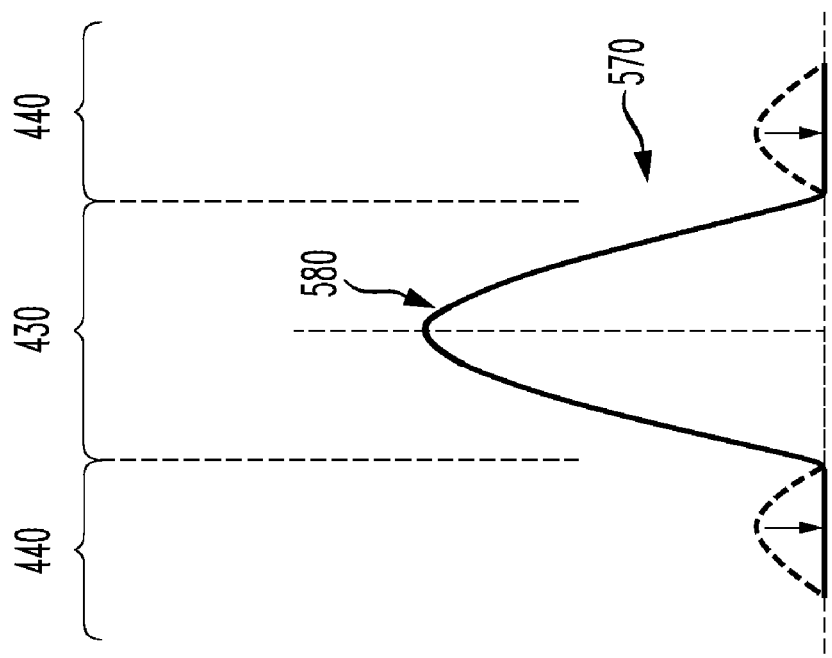
Figure 5C:
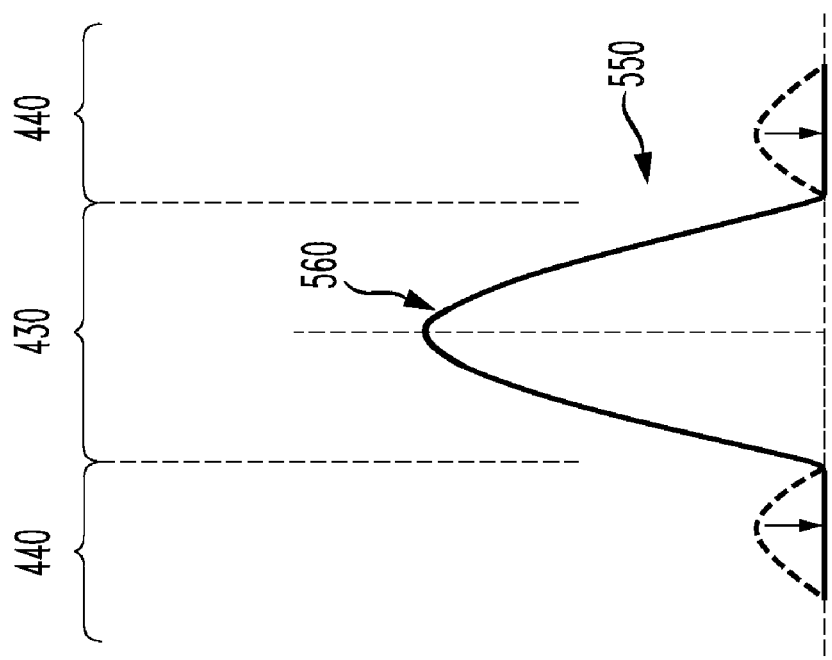

FIG. 5C illustrates what the precompensated optical symbol 530 might look like at point C of the optical system 300, having passed over the transmission medium 320. As the precompensated optical symbol 530 was preconditioned to account for any dispersion, or other impairments, after traversal of the transmission medium 320, a compensated optical symbol 550 results. The compensated optical symbol 550, in this embodiment, includes a central lobe 560 located within the intended time slot region 430. If the apparatus 360 is employed properly, the compensated optical symbol 550 contains little or no side lobes located outside of the intended time slot 430. Thus, again, the additive effect of the precompensated side lobes 545 and any resulting dispersive side lobes as the symbol traverses the transmission medium 320, optimally results in the compensated optical symbol 550. For ease of understanding, a dotted line has been included within FIG. 5C indicating what the initial optical symbol 510 might look like at point C were it not to encounter the apparatus 360.

FIG. 5D illustrates what the compensated optical symbol 550 might look like at point D of the optical system 300, as it approaches the receiver 330. What results is an output optical symbol 570. The output optical symbol 570, in this embodiment, includes a central lobe 580 located within the intended time slot region 430. Again, if the apparatus 360 is employed properly, the output optical symbol 570 contains little or no side lobes located outside of the intended time slot 430. For ease of understanding, a dotted line has been included within FIG. 5D indicating what the initial optical symbol 510 might look like at point D were it not to encounter the apparatus 360.

Attention will now turn to FIGS. 6A thru 6D, with continued reference to FIGS. 3, 4A, 4B, and brief reference to FIG. 1A. Like reference numbers, in this description, will be used to indicate like features. FIGS. 6A thru 6D illustrate the general profile of an optical symbol as it traverses an optical system similar to the optical system of FIG. 3. The optical symbol may be tracked at points A, B, C, and D of FIG. 3, and will be illustrated in the associated FIGS. 6A thru 6D. The embodiment of FIGS. 6A thru 6D is based upon the assumption that the apparatus 360 of FIG. 3 is positioned proximate the transmitter 310, and that the apparatus is similar to the apparatus 100 of FIG. 1A.

Figure 6B:
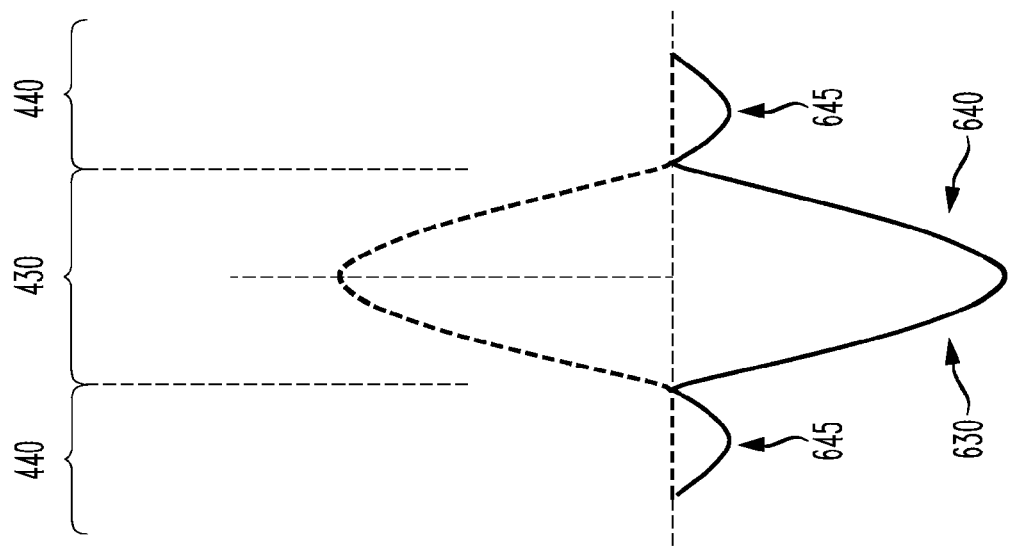
Figure 6A:
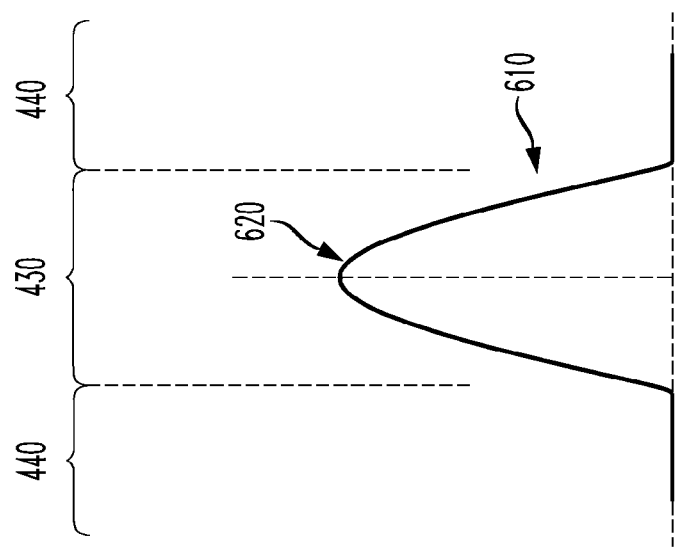

FIG. 6A illustrates an input optical symbol 610, representing one packet of information, as it might appear at point A of the optical system 300 of FIG. 3. The input optical symbol 610, having just been created by a data modulator (e.g., similar to the date modulator 180 of FIG. 1A), has little to no dispersive effects, and thus may be considered an ideal optical symbol. Accordingly, the input optical symbol 610 is focused substantially, if not entirely, within the intended time slot region 430 as a central lobe 620.

FIG. 6B illustrates what the input optical symbol 610 might look like at point B of the optical system 300, having passed through the apparatus 360. The apparatus 360, in this disclosed embodiment, is configured to precompensate the input optical symbol 610 for any dispersion, or other impairments, that may result from the input optical symbol 610 traversing the transmission medium 320. For example, the apparatus 360 may be configured to precompensate the input optical symbol 610 based upon information fed back through the feedback controller 370. What results after the input optical symbol 610 passes through the apparatus 360, is a precompensated optical symbol 630.

The precompensated optical symbol 630, in this embodiment, includes a precompensated central lobe 640 located within the intended time slot region 430, as well as precompensated side lobes 645 located outside of the intended time slot region 430. The precompensated central lobe 640 and the precompensated side lobes 645, in the embodiment shown, are more than 90° out of phase with respect to the central lobe 620. For example, in the embodiment of FIG. 6B, precompensated central lobe 640 and the precompensated side lobes 645 are about 180° out of phase with respect to the central lobe 620. This is in direct contrast to the embodiment of FIGS. 5A thru 5D, wherein its central lobe 540 remained within phase with its central lobe 520.

The precompensated optical symbol 630 may be formed by appropriately driving the modulators associated with the apparatus 360. For instance, assuming the apparatus 360 is similar to the apparatus 100 of FIG. 1A, the electro-optic modulators 160*a*, 160*b* associated with the center waveguide arm 140*b* and the side waveguide arms 140*a*, 140*c* may be driven by the modulator controller 170, such that energy is transferred from the central lobe 620, resulting in the precompensated central lobe 640 and the precompensated side lobes 645. Additionally, the electro-optic modulators 160*a*, 160*b* associated with the side waveguide arms 140*a*, 140*c* may be driven by the modulator controller 170 to alter the phase of the precompensated central lobe 640 and the precompensated side lobes 645. Those skilled in the art, given the teachings herein, would understand how to drive the modulators 160*a*, 160*b* to result in the precompensated optical symbol 630, having the precompensated central lobe 640 and the precompensated side lobes 645. For ease of understanding, a dotted line has been included within FIG. 6B indicating what the initial optical symbol 610 might look like at point B were it not to encounter the apparatus 360.

FIG. 6C illustrates what the precompensated optical symbol 630 might look like at point C of the optical system 300, having passed over the transmission medium 320. As the precompensated optical symbol 630 was preconditioned to account for any dispersion, or other impairments, after traversal of the transmission medium 320, a compensated optical symbol 650 results. The compensated optical symbol 650, in this embodiment, includes a compensated central lobe 660 located within the intended time slot region 430. If the apparatus 360 is employed properly, the compensated optical symbol 650 contains little or no side lobes located outside of the intended time slot 430. In the embodiment of FIG. 6C, the compensated optical symbol 650 is substantially similar to the input optical symbol 610, but for the difference in polarity between the compensated central lobe 660 and the central lobe 620. Those skilled in the relevant art would understand the appropriate steps required to accommodate this polarity shift. Again, for ease of understanding, a dotted line has been included within FIG. 6C indicating what the initial optical symbol 610 might look like at point C were it not to encounter the apparatus 360.

FIG. 6D illustrates what the compensated optical symbol 650 might look like at point D of the optical system 300, as it approaches the receiver 330. What results is an output optical symbol 670. The output optical symbol 670, in this embodiment, includes a central lobe 680 located within the intended time slot region 430. The reverse polarity of the central lobe 680 remains. Again, if the apparatus 360 is employed properly, the output optical symbol 670 contains little or no side lobes located outside of the intended time slot 430. For ease of understanding, a dotted line has been included within FIG. 6D indicating what the initial optical symbol 610 might look like at point D were it not to encounter the apparatus 360.

Attention will now turn to FIGS. 7A thru 7D, with continued reference to FIGS. 3, 4A, 4B, and brief reference to FIG. 1A. Like reference numbers, in this description, will be used to indicate like features. FIGS. 7A thru 7D illustrate the general profile of an optical symbol as it traverses an optical system similar to the optical system of FIG. 3. The optical symbol may be tracked at points A, B, C, and D of FIG. 3, and will be illustrated in the associated FIGS. 7A thru 7D. The embodiment of FIGS. 7A thru 7D is based upon the assumption that the apparatus 360 of FIG. 3 is positioned proximate the receiver 330, and that the apparatus is similar to the apparatus 100 of FIG. 1A.

Figure 7B:
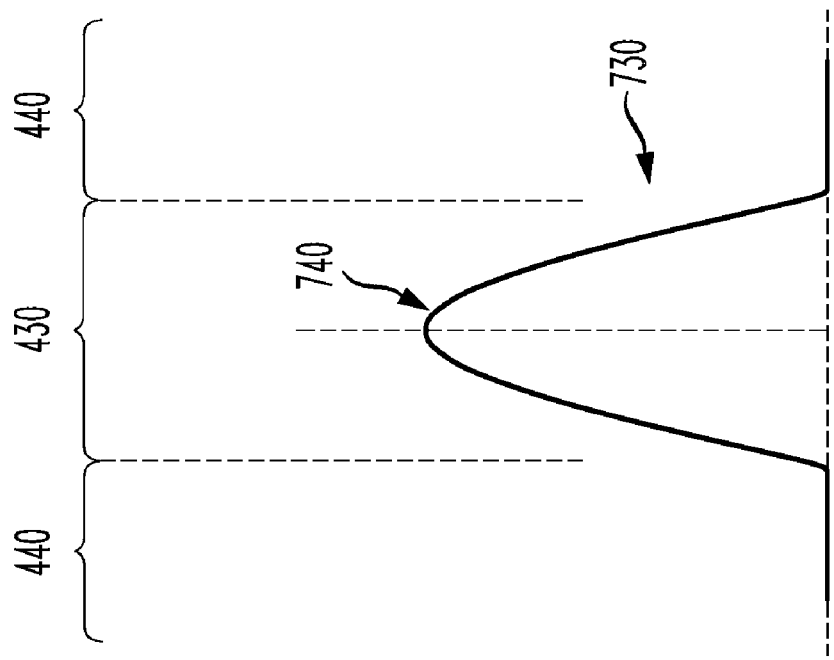
FIGS. 7A thru 7D illustrate yet another general profile of one specific optical symbol as it traverses an optical system similar to the optical system of FIG. 3.
Figure 7A:
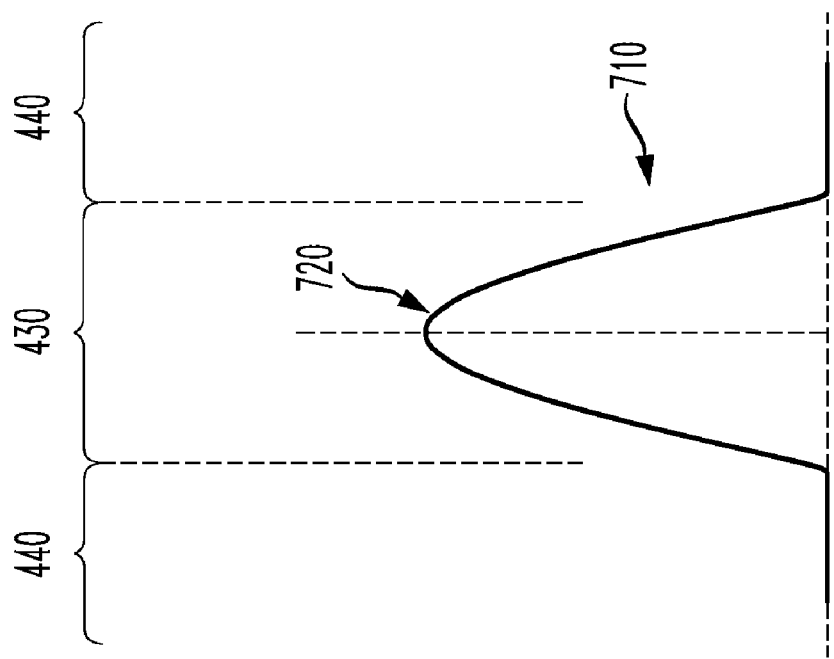

FIG. 7A illustrates an input optical symbol 710, representing one packet of information, as it might appear at point A of the optical system 300 of FIG. 3. The input optical symbol 710, having just been created by a data modulator (e.g., similar to the date modulator 180 of FIG. 1A), has little to no dispersive effects, and thus may be considered an ideal optical symbol. Accordingly, the input optical symbol 710 is focused substantially, if not entirely, within the intended time slot region 430 as a central lobe 720.

FIG. 7B illustrates what the input optical symbol 710 might look like at point B of the optical system 300 soon after it leaves the transmitter 310, and prior to traversing the transmission medium 320. As the apparatus 360 is not located proximate the transmitter 310 in this embodiment, the input optical symbol 710 will not encounter the apparatus 360 until a later point in the optical system 300. What results is the optical symbol 730. The optical symbol 730, not having traversed the transmission medium 320, has little to no dispersive effects, and thus is very similar to the input optical symbol 710. Accordingly, the optical symbol 730 is focused substantially within the intended time slot region 430 as a central lobe 740.

Figure 7D:
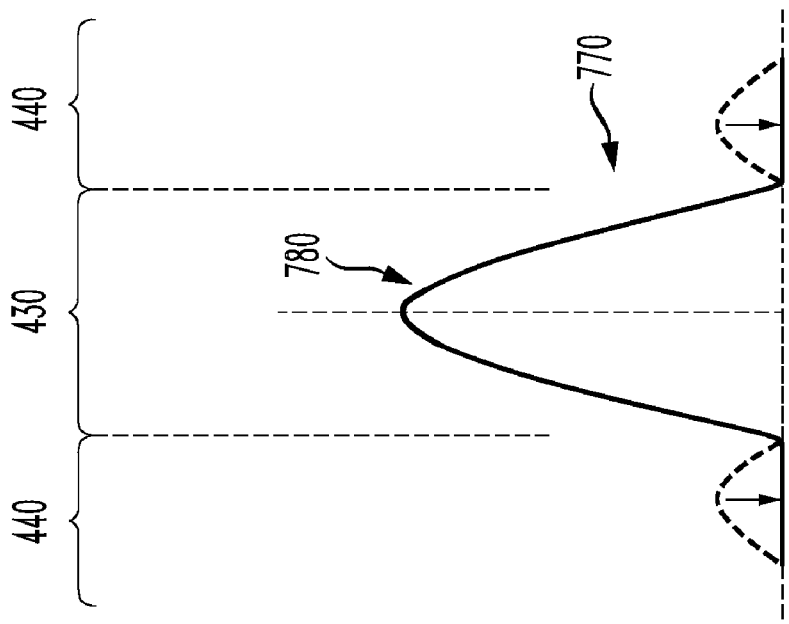
Figure 7C:
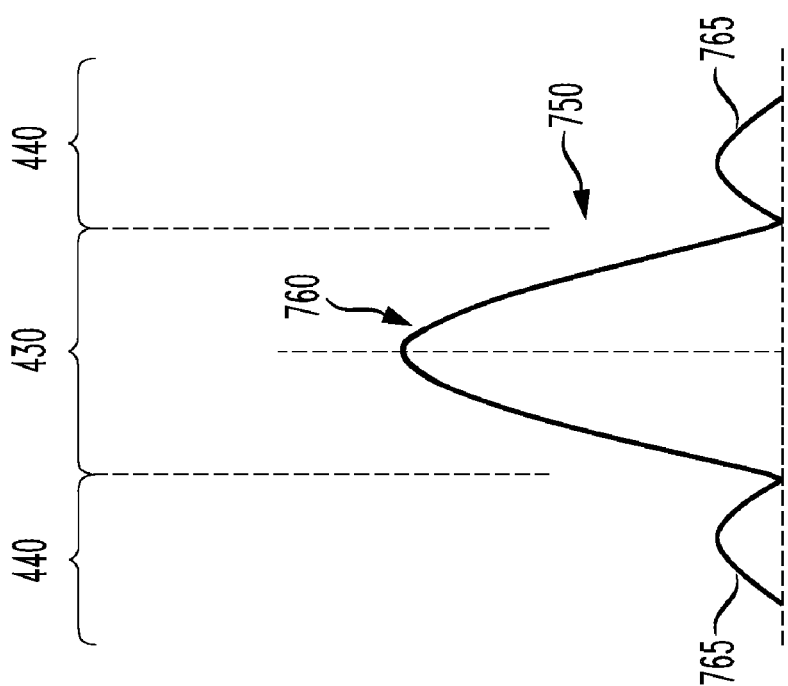

FIG. 7C illustrates what the optical symbol 730 might look like at point C of the optical system 300, having passed over the transmission medium 320. As is well known, the traversal of an optical symbol over a significantly long transmission medium, or at high symbol rates, often creates dispersive or other effects thereon. Such is the case with the optical symbol 730, which results in a dispersed optical symbol 750 after traversing the transmission medium 320. The dispersed optical symbol 750, in this embodiment, includes a central lobe 760 located within the intended time slot region 430, as well as dispersed side lobes 765 located outside of the intended time slot region 430.

FIG. 7D illustrates what the dispersed optical symbol 750 might look like at point D of the optical system 300, after it passes through the apparatus 360. The apparatus 360, in this disclosed embodiment, is configured to compensate the dispersed optical symbol 750 for any dispersion, or other impairments, that may result from the input optical symbol 710 traversing the transmission medium 320. What results after the input optical symbol 710 passes through the apparatus 360, is a compensated optical symbol 770.

The compensated optical symbol 770, in this embodiment is an output optical symbol, and includes a central lobe 780 located within the intended time slot region 430. As a result of the apparatus 360, the compensated optical symbol 770 contains little, or no, side lobes located outside of the intended time slot region 430.

The compensated optical symbol 770 may be formed by appropriately driving the modulators associated with the apparatus 360. For instance, assuming the apparatus 360 is similar to the apparatus 100 of FIG. 1A, the electro-optic modulators 160*a*, 160*b* associated with the side waveguide arms 140*a*, 140*c* may be driven by the modulator controller 170, such that at least a portion of the energy is transferred from the dispersed side lobes 765 to the central lobe 760, thus resulting in the central lobe 780 and the disappearance of the dispersed side lobes 765. Additionally, the electro-optic modulators 160a, 160b associated with the side waveguide arms 140a, 140c may be driven by the modulator controller 170 to alter the phase to assist in the disappearance of the dispersed side lobes 765. Those skilled in the art, given the teachings herein, would understand how to drive the modulators 160a, 160b to result in the compensated optical symbol 770, having the central lobe 780. For ease of understanding, a dotted line has been included within FIG. 7D indicating what the initial optical symbol 710 might look like at point D were it not to encounter the apparatus 360.

Accordingly, in each of the embodiments of FIGS. 5A thru 5D, FIGS. 6A thru 6D, and FIGS. 7A thru 7D, a modulator controller is configured to drive modulators associated with the waveguide arms of the apparatus, such that following the transmission over a distance, components of an optical symbol outside of the intended time slot are attenuated relative to components within the intended time slot. In the aforementioned FIGS. the components of the optical symbol are the central lobe and/or side lobes. However, other components may be attenuated with respect to one another and remain within the purview of the disclosure.

Although the present disclosure has been described in detail, those skilled in the pertinent art should understand that they can make various changes, substitutions and alterations herein without departing from the spirit and scope of the disclosure.

What is claimed is:

1. An apparatus, comprising:
    first and second 1×N couplers integrated on a substrate and configured to receive an optical symbol having an intended time slot, N being at least three;
    N waveguide arms integrated on the substrate, having modulators and coupled between the first and second 1×N couplers; and
    a modulator controller configured to drive the modulators such that, following transmission over a distance, components of the optical symbol outside of the intended time slot are attenuated relative to components within the intended time slot.

2. The apparatus of claim 1 wherein the intended time slot is a central lobe of the optical symbol, and further wherein the modulator controller is configured to drive the modulators such that, following transmission over the distance, side lobes and a central lobe of the optical symbol are attenuated relative to one another.

3. The apparatus of claim 2 wherein the modulator controller is configured to drive the modulators to transfer energy between the central lobe and the side lobes.

4. The apparatus of claim 3 further including a transmitter integrated on the substrate, and further wherein the modulator controller is configured to create the side lobes by transferring energy from the central lobe.

5. The apparatus of claim 4 wherein the side lobes created by the modulator controller are more than 90° out of phase with respect to the central lobe.

6. The apparatus of claim 4 further including a data modulator integrated on the substrate between a light source and the first 1×N coupler.

7. The apparatus of claim 4 further including a feedback controller configured to provide feedback information from the optical symbol having been transmitted over the distance to the modulator controller to adjust an amplitude or phase of the side lobes being created.

8. The apparatus of claim 3 further including a receiver integrated on the substrate, and further wherein the modulator controller is configured to transfer the energy from the side lobes.

9. The apparatus of claim 8 wherein the modulator controller transfers at least a portion of the energy to the central lobe.

10. The apparatus of claim 1 wherein an optical pathlength of each of the N waveguide arms is different.

11. The apparatus of claim 1 wherein optical pathlengths of the N waveguide arms sequentially change by a fixed amount $\Delta L$.

12. The apparatus of claim 11 wherein the fixed amount $\Delta L$ is less than a bit period of the optical symbol.

13. The apparatus of claim 1 wherein the first and second 1×N couplers have a power splitting distribution that is highest for a center most waveguide arm.

14. The apparatus of claim 1 wherein the N waveguide arms include a center most waveguide arm and one or more opposing pairs of side waveguide arms, and further wherein the modulators are associated with the one or more pairs of side waveguide arms.

15. The apparatus of claim 14 wherein each side waveguide arm has a modulator associated therewith.

16. The apparatus of claim 14 wherein each side waveguide arm has two or more modulators associated therewith.

17. The apparatus of claim 1 wherein the modulators are electro-optic modulators.

18. The apparatus of claim 17 wherein ones of the electro-optic modulators are configured to be forward biased to get primarily phase modulation or are configured to be reverse biased to get primarily amplitude modulation.

19. The apparatus of claim 18 such that at least one waveguide arm has two modulators, one acting as a phase modulator and one as an amplitude modulator.

20. The apparatus of claim 17 wherein ones of the electro-optic modulators are configured to be forward biased to get amplitude modulation via free-carrier absorption.

21. The apparatus of claim 17 wherein ones of the modulators are thermooptic modulators to get primarily phase modulation.

22. The apparatus of claim 1 wherein each waveguide arm contains at least one modulator.

23. The apparatus of claim 1 wherein the first and second 1×N couplers are star couplers.

24. The apparatus of claim 1 wherein the first or second 1×N couplers are not even splitting couplers.

* * * * *